United States Patent
Liu et al.

(10) Patent No.: US 7,692,360 B2
(45) Date of Patent: Apr. 6, 2010

(54) APPARATUS FOR ULTRASONIC VIBRATION-ASSISTED MACHINING

(75) Inventors: Xiang Dong Liu, Singapore (SG); Xin Ding, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 11/661,082

(22) PCT Filed: Aug. 26, 2004

(86) PCT No.: PCT/SG2004/000260

§ 371 (c)(1),
(2), (4) Date: Feb. 26, 2007

(87) PCT Pub. No.: WO2006/022592

PCT Pub. Date: Mar. 2, 2006

(65) Prior Publication Data

US 2007/0257579 A1    Nov. 8, 2007

(51) Int. Cl.
*H04R 1/02* (2006.01)
(52) U.S. Cl. .................. 310/323.19; 310/328
(58) Field of Classification Search .................. 310/328
See application file for complete search history.

(56) References Cited

U.S. PATENT DOCUMENTS

| | | | |
|---|---|---|---|
| 3,746,257 A * | 7/1973 | Broad et al. ............. | 239/102.2 |
| 4,856,391 A * | 8/1989 | Mishiro ........................ | 82/137 |
| 4,934,103 A | 6/1990 | Campergue et al. | |
| 5,305,556 A | 4/1994 | Kopp et al. | |
| 5,801,329 A * | 9/1998 | Schmidt ....................... | 174/42 |
| 5,818,188 A * | 10/1998 | Hirai et al. ................... | 318/480 |
| 6,621,694 B2 * | 9/2003 | Lee et al. ............... | 361/679.34 |
| 6,724,128 B2 * | 4/2004 | Cheng et al. ................ | 310/328 |
| 6,762,535 B2 | 7/2004 | Take et al. | |
| 2004/0027032 A1 * | 2/2004 | Moteki et al. .......... | 310/323.02 |
| 2006/0244571 A1 * | 11/2006 | Yaney et al. ........... | 340/310.17 |

FOREIGN PATENT DOCUMENTS

JP    2002036106 A    2/2002

* cited by examiner

*Primary Examiner*—Walter Benson
*Assistant Examiner*—Bryan P Gordon
(74) *Attorney, Agent, or Firm*—Jacobson Holman PLLC

(57) ABSTRACT

Apparatus for ultrasonic vibration-assisted machining, the apparatus comprising an ultrasonic transducer for generating ultrasonic waves in a vibration horn; first clamp on the vibration horn at a static node of the ultrasonic waves; and a second clamp between the first clamp and a lowermost end of the vibration horn. The second clamp comprises a linear bearing for reducing vibration of the vibration horn in a direction laterally of the vibration horn, and allowing vibration of the vibration horn in the direction of a longitudinal axial of the vibration horn.

15 Claims, 4 Drawing Sheets

FIGURE 1 – PRIOR ART

APPARATUS FOR ULTRASONIC VIBRATION-ASSISTED MACHINING

This is a national stage of PCT/SG04/000260 filed Aug. 26, 2004 and published in English.

FIELD OF THE INVENTION

This invention relates to apparatus for ultrasonic vibrations-assisted machining and refers particularly, though not exclusively to apparatus for ultrasonic vibration-assisted machining of metals such as steel and stainless steel.

BACKGROUND OF THE INVENTION

Ultrasonic vibration-assisted machining has several important advantages. One important advantage flows from the friction reducing action, which arises when the cutting edge or point of the tool separates from the work during each vibration cycle and which introduces an ultrasonic pumping action. This pumping action allows transmission of cooling fluids to all areas of the workpieace area. The cooling fluid may be air.

Normal machining has an accuracy of greater than 5 μm and uses ordinary machine tools. Ultrasonic vibration-assisted machining was introduced in the 1960s to provide advantages over normal machining. The expected advantages have not been realized, however, as it did not increase tool life nor improve surface finish. Also, cutting efficiency is low as the cutting speed must be less than the vibration speed.

Since 1980, ultra-precision machining was developed to meet the demands of fabricating complicated optics. A diamond tool bit is the only tool bit that can be used to generate an optical mirror surface finish. However, a diamond tool bit cannot be used on steel due to the strong chemical reaction between the diamond and the steel. The chemical reaction causes graphitization of the diamond.

With prior art systems, the vibration horn is clamped at two static node points of the vibration wave as shown in FIG. 1. The diamond tool bit is mounted on the free end of the vibration horn. To achieve a mirror surface finish, the induced lateral vibration of the horn in the radial direction must be significantly reduced.

For the prior art method of the vibration horn with two static clamping points, there is some distance from the lower static node point to the free end where the tool bit is mounted. In such a case, the point at the free end has reduced stiffness in the lateral/radial direction and lateral vibration in the lateral/radial direction can easily be induced.

To increase the lateral stiffness, the diameter of the horn is increased and, in turn, the power of the ultrasonic vibration generator is also increased. Therefore, the overall size of the apparatus is increased. Furthermore, the operational temperature of the device increases due to the larger power, and is easily damaged due to the higher temperature. Also, lateral (or radial) vibration damages the tool bit. It also causes deeper cuts and therefore lower quality surface finish. Such lateral radial vibrations are normally of the order of 4 μm.

To prevent excessive tool wear, a two stage process has been proposed using electroless nickel plating or coating on a workpiece before machining when fabricating optical mold inserts for the injection molding of plastic lenses. However such methods have many disadvantages. Also, they are not capable of manufacturing moulds with high durability as the nickel tends to lift off the steel workpiece.

SUMMARY OF THE INVENTION

According to a first aspect there is provided an apparatus for ultrasonic vibration-assisted machining, the apparatus comprising: an ultrasonic transducer for generating ultrasonic waves in a vibration horn; a first clamp on the vibration horn at a static node of the ultrasonic waves; and a second clamp between the first clamp and a lowermost end of the vibration horn. The second clamp comprises a linear bearing for reducing vibration of the vibration horn in a direction laterally of the vibration horn, and allowing vibration of the vibration horn in the direction of a longitudinal axial of the vibration horn.

The linear bearing may be axially spaced from the first clamp by less than half a wavelength of the ultrasonic waves.

According to a second aspect there is provided apparatus for ultrasonic vibration-assisted machining, the apparatus comprising: an ultrasonic transducer for generating ultrasonic waves in a vibration horn; a first clamp on the vibration horn at a static node of the ultrasonic waves; and a second clamp between the first clamp and a lowermost end of the vibration horn. The second clamp is axially spaced from the first clamp by less than half a wavelength of the ultrasonic waves.

The second clamp may comprise a linear bearing for reducing vibrations of the vibration horn in a direction laterally of the vibration horn and allowing vibration of the vibration horn in the direction -of a longitudinal axis of the vibration horn.

For both aspects, the second clamp may be generally U-shaped and may comprise an upper clamp, a lower clamp, and an intermediate portion between the upper clamp and the lower clamp. The upper clamp and the lower clamp may be radially adjustable relative to the linear bearing.

The second clamp may be removably and adjustably mounted in a mounting block. The first clamp may be removably attached to the mounting block. The mounting block may be removably and adjustably mounted on a tool post. The tool post may comprise: an upper portion, a lower portion, a gap between the upper portion and the lower portion, and an adjusting mechanism for adjusting the gap.

The apparatus may further comprise a tool bit releasably secured to the vibration horn at the lowermost end thereof.

BRIEF DESCRIPTION OF THE DRAWINGS

In order that the present invention may be fully understood and readily put into practical effect, there shall now be described by way of non-limitative example only preferred embodiments of the present invention, the description being with reference to the accompanying illustrative drawings in which.

DETAILED DESCRIPTION OF THE PREFERRED EMBODIMENT

Figure 1:
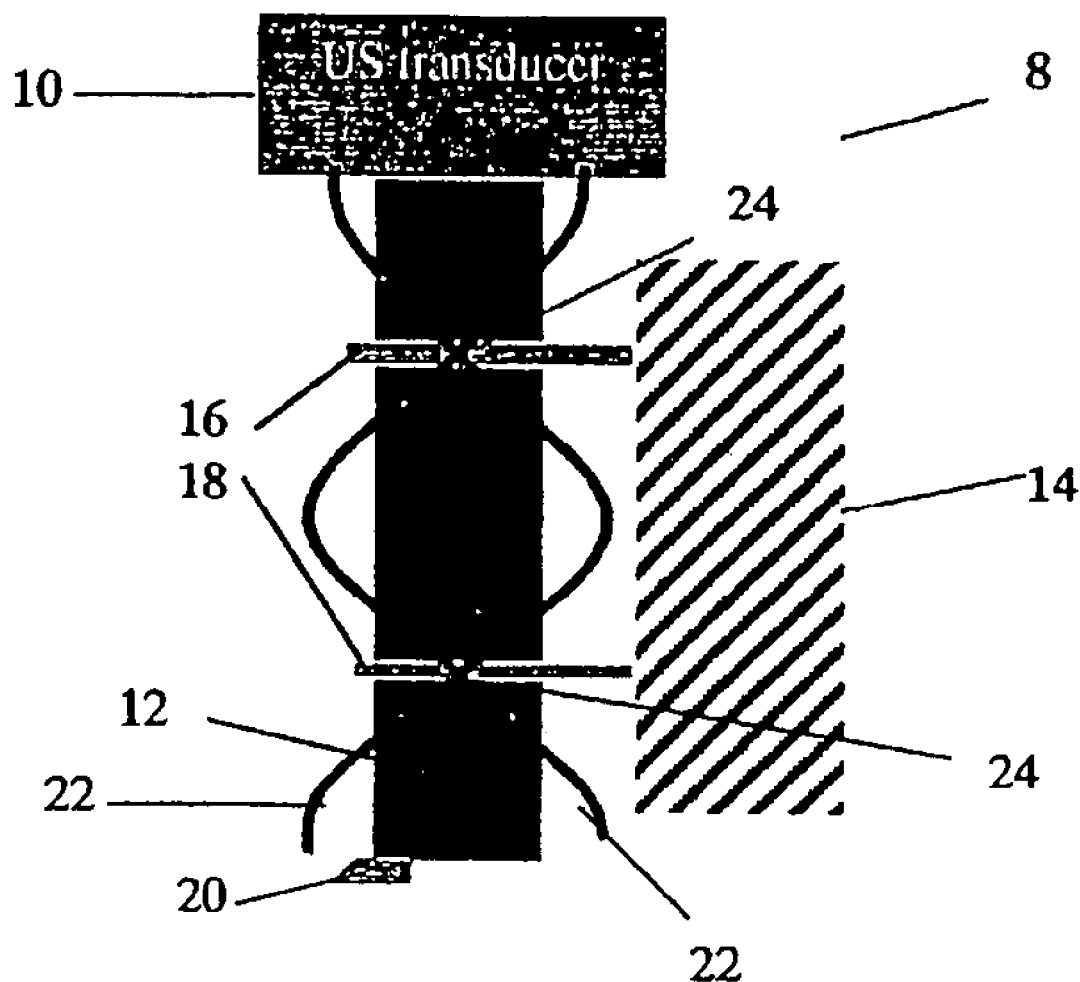
FIG. 1 is a schematic side view of a prior art apparatus.

To refer to FIG. 1, there is shown a prior art apparatus 8. Here, there is an ultrasound transducer 10 with a vibration horn 12. These are mounted to a mounting block 14 by upper clamp 16 and lower clamp 18. The tool bit 20 is at the lowermost end of the vibration horn 12. The ultrasound transducer 10 produces sound waves 22 at, for example, 40 KHz. The waves have maximum amplitude at ultrasound transducer 10, and at tool bit 20 to maximize the movement of tool bit 20. To hold the vibration horn 12 in place, and to prevent unwanted radial (or lateral) movement, the vibration horn 12 is secured to mounting block 14 by upper clamp 16 and lower clamp 18. Clamps 16, 18 are located at static node points 24 to allow them to function without interfering with the operation of tool bit 20. However, that means there is inherently a gap between lower clamp 18 and tool bit 20. This allows unwanted motion to occur at tool bit 20, the unwanted vibration being induced by vibration horn 12.

Figure 2:
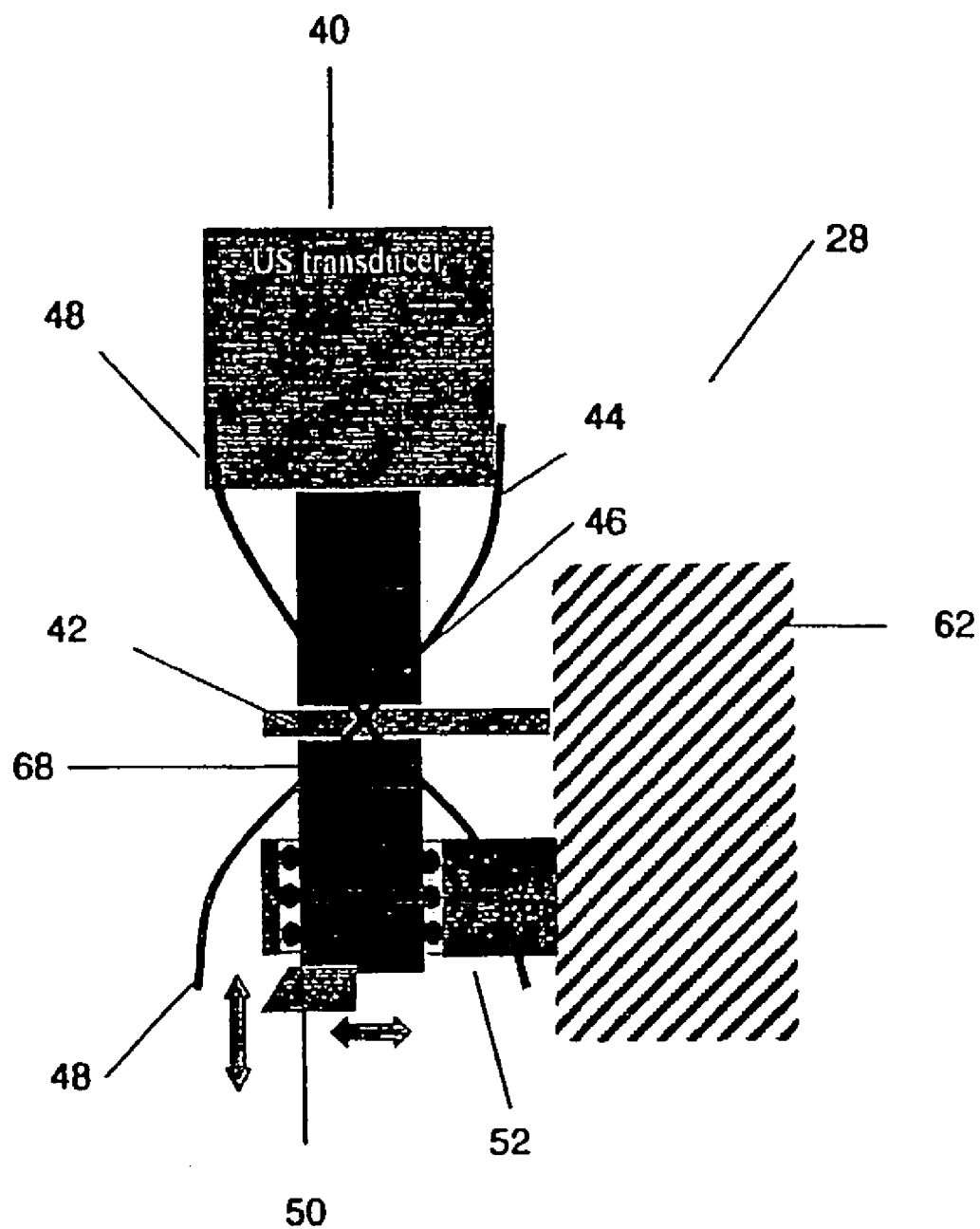
FIG. 2 is a schematic side view of the preferred embodiment.
Figure 3:
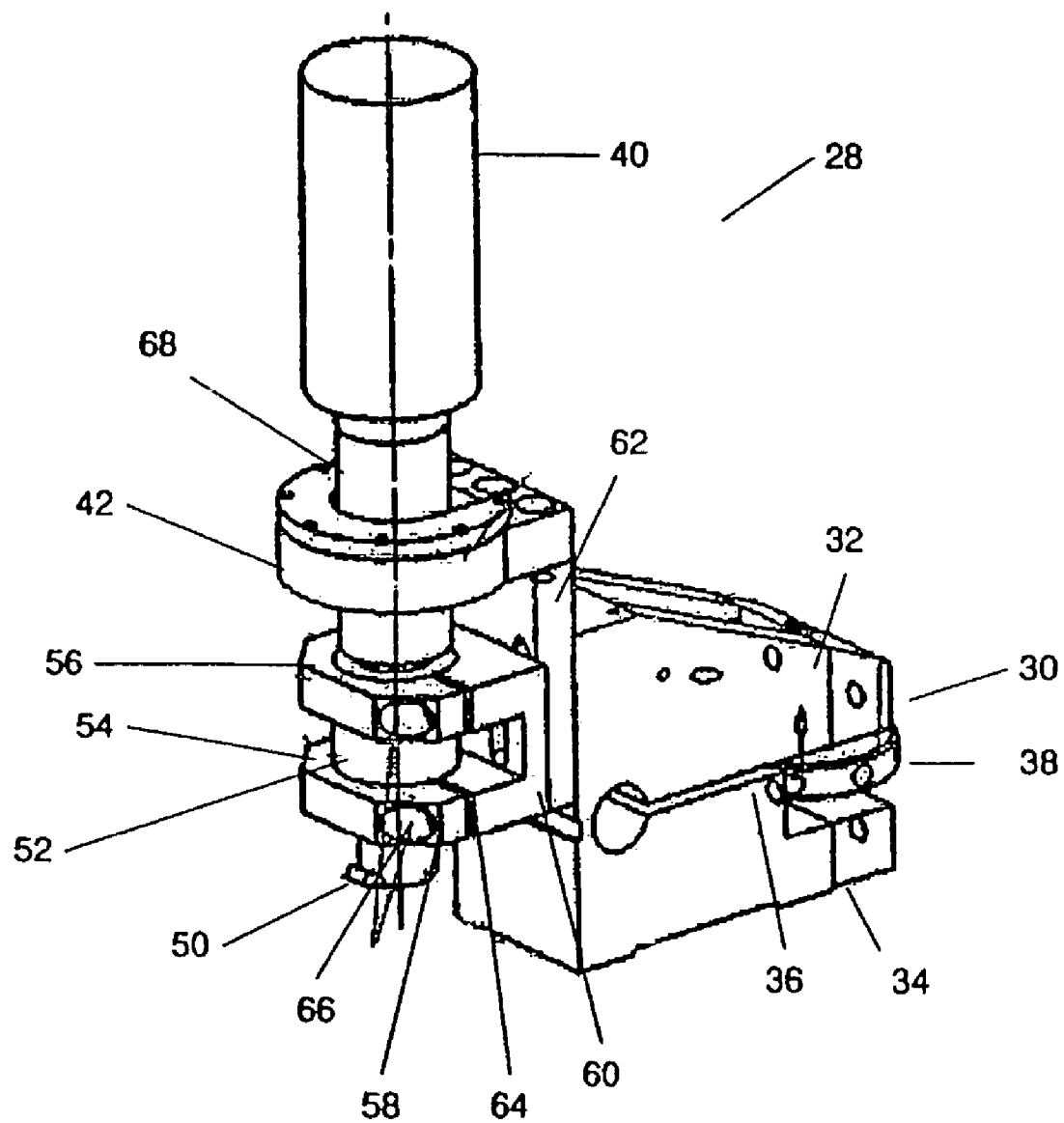
FIG. 3 is a perspective view of the preferred embodiment.

To now refer to FIGS. 2 and 3, there is shown apparatus 28 according to a preferred embodiment. Here, there is a tool post 30 having an upper post 30 and a lower post 34 with a gap 36 therebetween. An adjusting knob 38 on a threaded shaft (not shown) is used to adjust gap 36 to enable the apparatus 28 to be correctly aligned and positioned.

An ultrasound transducer 40 is provided with a vibration horn 68. The ultrasound transducer 40 produces vibration waves 44 in the axial direction of vibration horn 68. The waves 44 are at their maximum amplitude 98 at ultrasound transducer 40 and at tool bit 50 mounted at the lowermost end of vibration horn 68. The waves 44 have a single static node 46. At static node 46 is provided a clamping ring 42. In this way clamping ring 42 holds the vibration horn 68. Between static node 46 and maximum amplitude 48 at tool bit 50 is a linear bearing 52. Linear bearing 52 allows vibration in the direction of the longitudinal axis of vibration horn 68, but minimizes vibration in the radial (or lateral) direction of vibration horn 68.

Linear bearing 52 is attached to mounting block 62 by a U-shaped bearing mounting 54 that has an upper clamp 56 and a lower clamp 58 joined by an intermediate portion 60. Intermediate portion 60 is removably and adjustably mounted to mounting block 62. Mounting block 62 is removably and adjustably mounted to tool post 30.

Upper clamp 56 and lower clamp 60 each is split, and each has a gap 64. A tightening screw 66 is used to control the clamping force by clamps 56, 58 on linear bearing 52. In this way the radial/lateral vibration of vibration horn 68 can be adjusted, and controlled.

Figure 4:
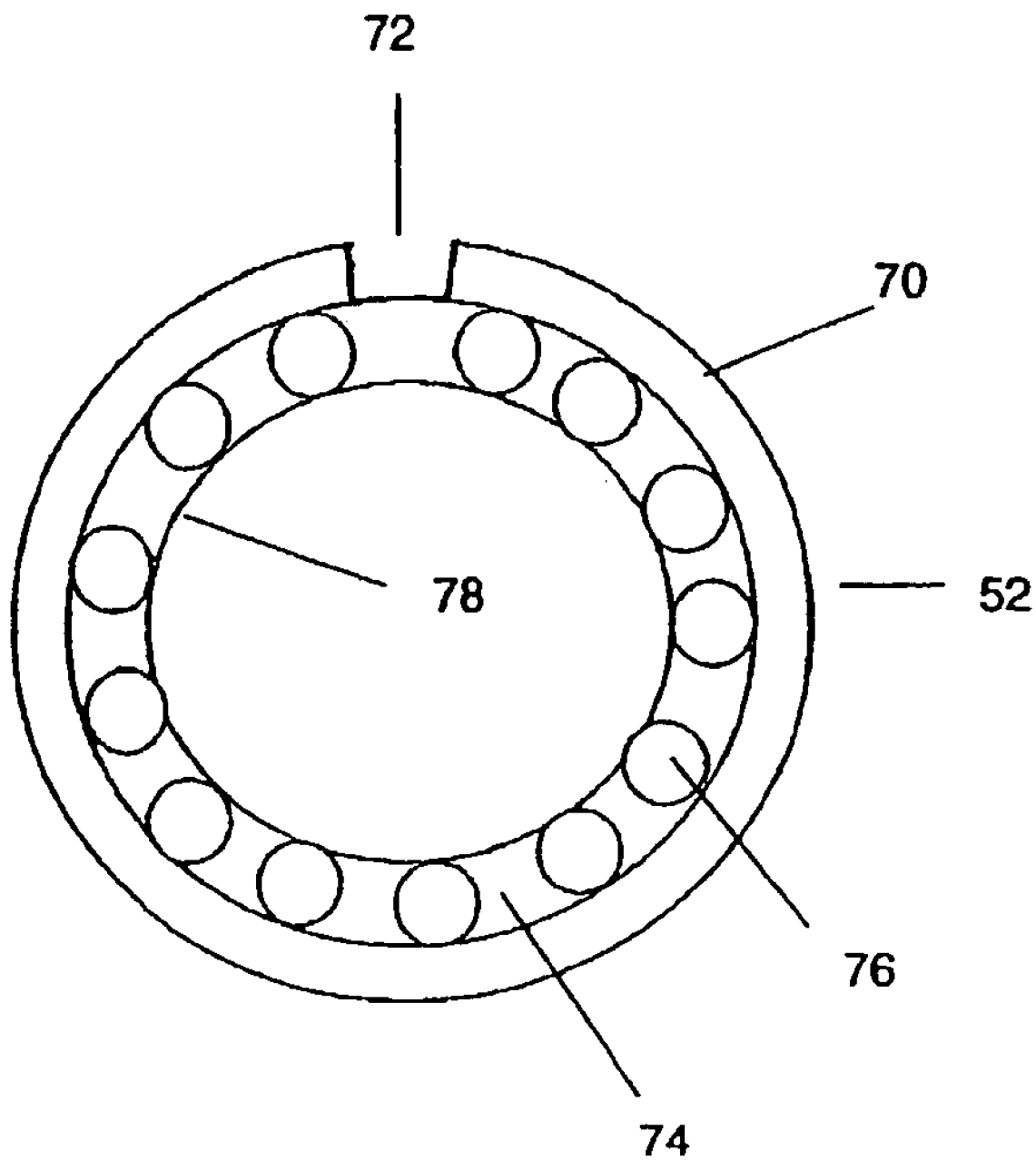
FIG. 4 is a horizontal cross sectional view of a preferred form of linear bearing.

The linear bearing 52 may be of any known construction such as, for example, the linear bearing known as "KUGEL-BUCHSE" available from Hiwin Technologies Corp of Glenview, Ill., USA. Such a linear bearing 52 is schematically shown in FIG. 4. It has an outer casing 70 with a gap 72 therein. The casing 70 is normally of a metal such as, for example, steel, and is preferably relatively thin. Within casing is a cylindrical body 74 in which are rotatably mounted a plurality of balls 76. The cylindrical body 74 is preferably of plastics material. The balls 76 are preferably of a metal such as, for example, steel and are held in body 74 in the manner of a snap fit. Balls 76 project beyond inner 78 and outer 80 surfaces of body 74. The gap 72 allows clamps 56, 58 to lighten on casing 71 and thus increase the clamping by body 74 on vibration horn 68.

In this way the vibration horn 68 may be of reduced axial length as the distance between static node points 24 is removed. Also, the axial distance between the clamping by clamp 42 and linear bearing 52 is preferably less than half the wavelength of waves 44. The lowermost clamping location (by lower clamp 58) is preferably adjacent the tool bit 50. However, it may be at any location on horn 68. Therefore, vibration horn 68 may be made with a reduced diameter as it does not require the relatively high structural strength of prior art vibration horn 12. For example, the lower clamp 58 may be in the range 3 to 15 mm from tool bit 50, preferably 10 mm. By having the vibration horn 68 of shorter axial length, and of smaller radius, the power required for ultrasound transducer 40 can be reduced. This reduces heat generation at tool bit 50. Also, it enables the apparatus to be used with high precision machines.

By way of example, ultrasound transducer 40 may be at 40 KHz and the vibration amplitude may vary within the range 0 to 24 μm, preferably 2 to 4 μm, depending on the cutting parameters. The cutting speed may be less than 10 meters per minute, with a depth of cut and feedrate being less than 10 micrometers and 10 micrometer per revolution, respectively. The lateral/radial, and random, vibration may be in the range 0.1 to 0.2 μm. Steel may therefore be machined to a mirror finish with an Ra<8 nm.

Furthermore, the productive life of tool bit 50 may be lengthened due to reduced graphite formation as a result of the reduced temperature. Increases in tool bit life of up to 600 times have been experienced.

The workpiece may be of any size, but for sizes greater than 40 mm in diameter a higher frequency and/or a lengthy machining time may result. Workpiece sizes down to 10 μm in diameter have been able to be machined. Workpieces may be of any suitable material such as, for example: glass, glass for lenses, steel, stainless steel, magnetizable stainless steel, moulding/tooling steel, and so forth.

Whilst there has been described in the foregoing description preferred embodiments of the present invention, it will be understood by those skilled in the technology concerned that many variations or modifications in details of design or construction may be made without departing from the present invention.

LIST OF REFERENCE NUMERALS

8—prior art apparatus
10—ultrasound transducer
12—vibration horn
14—mounting block
16—clipper clamp
18—lower clamp
20—tool bit
22—waves
24—static node points
26—maximum amplitude locations
28—apparatus of embodiment
30—tool post
32—upper part of 30
34—lower part of 30
36—gap between 32 & 34
38—adjusting knob
40—ultrasound transducer
42—clamping at static node
44—waves
46—static node
48—maximum amplitude
50—tool bit
52—linear bearing
54—bearing mounting (U-shaped)
56—upper clamp
58—lower clamp
60—intermediate portion
62—mounting block
64—gap in 56, 58
66—tightening screw
68—vibration horn 70—casing
72—gap in 70
74—body
76—balls
78—inner surface of 74
80—outer surface of 74

The invention claimed is:

1. Apparatus for ultrasonic vibration-assisted machining, the apparatus comprising:
   (a) a vibration horn having a longitudinal axis and a lowermost end for mounting a tool bit thereon;
   (b) an ultrasonic transducer for generating ultrasonic waves in the vibration horn;
   (c) a first clamp on the vibration horn at a static node of the ultrasonic waves; and
   (d) a second clamp between the first clamp and the lowermost end of the vibration horn;
   wherein the second clamp comprises a linear bearing for reducing vibration of the vibration horn in a direction laterally of the vibration horn, and allowing vibration of the vibration horn in the direction of the longitudinal axis of the vibration horn.

2. Apparatus as claimed in claim 1, wherein the linear bearing is axially spaced from the first clamp by less than half a wavelength of the ultrasonic waves.

3. Apparatus for ultrasonic vibration-assisted machining, the apparatus comprising:
   (a) a vibration horn having a lowermost end for mounting a tool bit thereon;
   (b) an ultrasonic transducer for generating ultrasonic waves in the vibration horn;
   (c) a first clamp on the vibration horn at a static node of the ultrasonic waves; and
   (d) a second clamp between the first clamp and the lowermost end of the vibration horn;
   wherein the second clamp is axially spaced from the first clamp by less than half a wavelength of the ultrasonic waves and wherein the second clamp comprises a linear bearing for reducing vibrations of the vibration horn in a direction laterally of the vibration horn and allowing vibration of the vibration horn in the direction of a longitudinal axis of the vibration horn.

4. Apparatus as claimed in claim 1, wherein the second clamp is generally U-shaped and comprises an upper clamp, a lower clamp, and an intermediate portion between the upper clamp and the lower clamp.

5. Apparatus as claimed in claim 4, wherein the upper clamp and the lower clamp are adjustable relative to the linear bearing.

6. Apparatus as claimed in claim 4, wherein the second clamp is removably and adjustably mounted in a mounting block.

7. Apparatus as claimed in claim 6, wherein the first clamp is removably attached to the mounting block.

8. Apparatus as claimed in claim 6, wherein the mounting block is removably and adjustably mounted in a tool post.

9. Apparatus as claimed in claim 8, wherein the tool post comprises:
   (a) an upper portion;
   (b) a lower portion;
   (c) a gap between the upper portion and the lower portion; and
   (d) an adjusting mechanism for adjusting the gap.

10. Apparatus as claimed in claim 1, further comprising a tool bit releasably secured to the vibration horn at the lowermost end thereof.

11. Apparatus as claimed in claim 1, wherein the static node is the only static node between the ultrasonic transducer and the lowermost end of the vibration horn.

12. Apparatus as claimed in claim 1, wherein the linear bearing comprises an outer casing, a cylindrical body within the casing, and a plurality of balls rotatably mounted within the cylindrical body.

13. Apparatus as claimed in claim 1, wherein the vibration horn has a short axial length and a small radius.

14. Apparatus as claimed in claim 3, wherein the linear bearing comprises an outer casing, a cylindrical body within the casing, and a plurality of balls rotatably mounted within the cylindrical body.

15. Apparatus as claimed in claim 14, wherein the vibration horn has a short axial length and a small radius.

* * * * *